(12) United States Patent
Martinsons

(10) Patent No.: US 12,516,978 B2
(45) Date of Patent: Jan. 6, 2026

(54) MULTIPHASE LOCK-IN SPECTROMETER ASSEMBLY APPLIED TO A MODULATED SOURCE OF MULTI-WAVELENGTH OPTICAL RADIATION, AND ASSOCIATED METHODS AND USES

(71) Applicant: CENTRE SCIENTIFIQUE ET TECHNIQUE DU BATIMENT (CSTB), Champs-Surmarne (FR)

(72) Inventor: Christophe Martinsons, Le Touvet (FR)

(73) Assignee: CENTRE SCIENTIFIQUE ET TECHNIQUE DU BATIMENT (CSTB), Champs-Surmarne (FR)

( * ) Notice: Subject to any disclaimer, the term of this patent is extended or adjusted under 35 U.S.C. 154(b) by 202 days.

(21) Appl. No.: 18/575,704

(22) PCT Filed: Jun. 20, 2022

(86) PCT No.: PCT/IB2022/055691
§ 371 (c)(1),
(2) Date: Dec. 29, 2023

(87) PCT Pub. No.: WO2023/275662
PCT Pub. Date: Jan. 5, 2023

(65) Prior Publication Data
US 2024/0337533 A1 Oct. 10, 2024

(30) Foreign Application Priority Data
Jun. 29, 2021 (FR) ........................ 2106958

(51) Int. Cl.
*G01J 3/10* (2006.01)
*G01J 3/28* (2006.01)
*G01J 3/42* (2006.01)

(52) U.S. Cl.
CPC ............... *G01J 3/10* (2013.01); *G01J 3/2823* (2013.01); *G01J 3/42* (2013.01)

(58) Field of Classification Search
CPC .... G01J 3/10; G01J 3/2823; G01J 3/42; G01J 2001/4242; G01J 3/0229; G01J 3/0262; G01J 3/08; G01J 3/433
See application file for complete search history.

(56) References Cited

U.S. PATENT DOCUMENTS 9,869,632 B2    1/2018  Bitter
2015/0300948 A1* 10/2015 Buchtal .............. G01N 21/3504
                                                356/454
(Continued)

FOREIGN PATENT DOCUMENTS

WO    2006135389 A2    12/2006

OTHER PUBLICATIONS

International Search Report w/English translation for PCT/IB2022/055691 mailed Sep. 13, 2022, 5 pages.
(Continued)

*Primary Examiner* — Tarifur R Chowdhury
*Assistant Examiner* — Carlos Perez-Guzman
(74) *Attorney, Agent, or Firm* — NIXON & VANDERHYE

(57) ABSTRACT

This relates to a multi-phase lock-in spectrometer assembly applied to a modulated source of multi-wavelength optical radiation, wherein the beam coming from the source is divided into two identical quadrature-modulated beams, the two beams being acquired by at least one spectrometer in order to calculate the amplitude spectrum and the phase spectrum of the modulated source of multi-wavelength optical radiation. Also disclosed are associated methods and uses.

21 Claims, 2 Drawing Sheets

(56) References Cited

U.S. PATENT DOCUMENTS

2021/0096068 A1\* 4/2021 Steinbacher ....... G01N 33/0027
2022/0107221 A1\* 4/2022 Watanabe ............. G01J 3/4412

OTHER PUBLICATIONS

Written Opinion of the ISA w/English translation for PCT/IB2022/055691 mailed Sep. 13, 2022, 13 pages.

\* cited by examiner

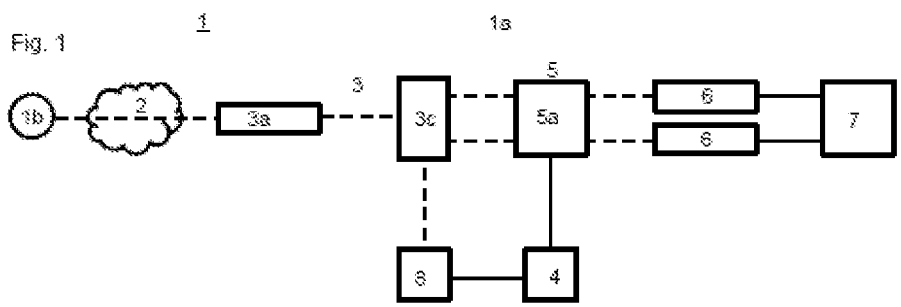
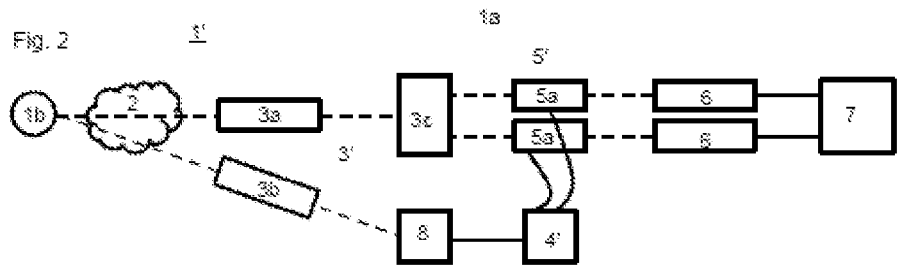
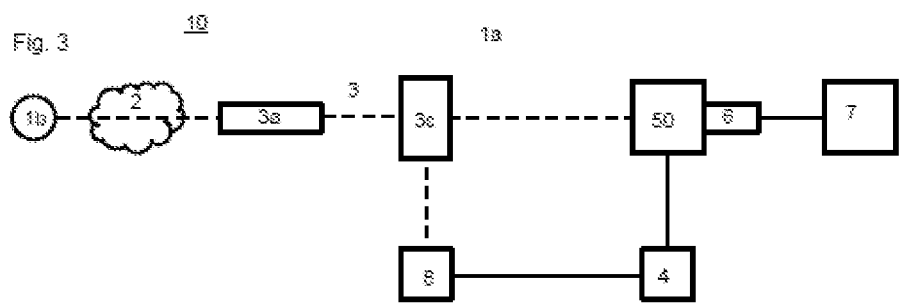

MULTIPHASE LOCK-IN SPECTROMETER ASSEMBLY APPLIED TO A MODULATED SOURCE OF MULTI-WAVELENGTH OPTICAL RADIATION, AND ASSOCIATED METHODS AND USES

CROSS-REFERENCE TO RELATED APPLICATIONS

This application is the US national stage of PCT/IB2022/055691, filed Jun. 20, 2022 and designating the United States, which claims the priority of FR 2106958, filed Jun. 29, 2021. The entire contents of each foregoing application are incorporated herein by reference.

BACKGROUND OF THE INVENTION

Field of the Invention

The present invention relates to the technical field of optical measurements by spectrometry and more particularly relates to a multiphase lock-in spectrometer assembly and associated uses.

Description of the Related Art

Lock-in spectrometry allows to detect only the alternating component of the spectrum of an optical radiation emitted by a modulated source. This technique has the particular advantage to discard stray ambient optical radiation or daylight, during measurements.

This technique is, for example, implemented using a modulated beam scanning spectrometer associated with a lock-in amplifier and then requires the use of a monochromator or spectral filter to split the collected polychromatic light into monochromatic light beams. For each measurement, this means scanning the spectrum, wavelength by wavelength, and an electrical lock-in detection at each wavelength. Modulated beam scanning spectrometry is a precise technique widely used in the laboratory, but has the disadvantage of being time-consuming and difficult to transport for non-laboratory measurements.

Consequently, prior art solutions still present drawbacks, and improvements are possible.

SUMMARY OF THE INVENTION

The present invention has notably as it object to provide a spectrometer assembly that uses time modulation of an optical radiation to be analyzed to measure its spectral power distribution, or spectrum.

Another object of the invention is to use the modulation frequency of the optical radiation to be analyzed.

Another object of the invention is to use a harmonic frequency of the modulation frequency of the optical radiation to be analyzed.

Another object of the invention is to provide a spectrometer assembly that implements purely optical lock-in detection.

Another object of the invention is to provide a multiphase lock-in spectrometer assembly configured to allow a lock-in detection simultaneously at all wavelengths of an optical radiation.

Another object of the invention is to allow the use of one, two or four inexpensive compact spectrometers to allow the lock-in processing to be parallelized.

Another object of the invention is to allow measurement of a complex spectrum consisting of an amplitude spectrum and a phase spectrum.

Another object of the invention is to provide a spectrometer assembly configured to implement a Differential Optical Absorption Spectroscopy (DOAS) technique for measuring the concentration of at least one element present in the air.

Another object of the invention is to provide a spectrometer assembly configured to carry out NO2 concentration measurements in the air.

Another object of the invention is to provide a spectrometer assembly configured to carry out air turbidity measurements.

Another object of the invention is to provide a spectrometer assembly configured to use a lighting element arranged in the environment as a source of optical radiation.

Thus, the present invention has as its object a multiphase lock-in spectrometer assembly applied to a modulated source of multi-wavelength optical radiation, said spectrometer assembly comprising a collection assembly configured to collect multi-wavelength optical radiation emitted by the modulated source, characterized in that the collection assembly comprises at least one collection optic and is configured to output at least two identical source optical radiation beams; the spectrometer assembly comprises a lock-in assembly configured to generate at least one reference signal based on the phase and modulation frequency of the optical radiation emitted by the optical radiation source, two spectrometers, a modulation assembly configured to control, based on the at least one reference signal, an acquisition by each spectrometer of a plurality of spectra, the spectra comprising information for at least one wavelength range of the optical radiation wavelengths, each spectrum being measured on N time sections of the source optical radiation beam, N being an integer greater than or equal to one, each time section having a duration corresponding to a period 1/fm and being spaced from a time section of the same type by a period 1/fm being a frequency used to control the modulation assembly obtained from the at least one reference signal; a first spectrometer is configured to acquire the spectra ($Ii(\lambda)$, with $i \in \{1, \ldots, N\}$) on first time sections, of a first source optical radiation beam, said to be in phase relative to the optical radiation collected by the collection assembly; a second spectrometer is configured to acquire the spectra ($Qi(\lambda)$, with $i \in \{1, \ldots, N\}$) on second time sections, of a second source optical radiation beam, in phase quadrature relative to the first time sections; the first spectrometer is configured to measure, without recourse to the modulation assembly, a spectral quantity of the first source optical radiation beam ($I0(\lambda)$); the second spectrometer is configured to measure, without recourse to the modulation assembly, a spectral quantity of the second source optical radiation beam ($Q0(\lambda)$); the spectrometer assembly comprises a low-pass filter unit configured to be applied to the spectra ($Ii(\lambda)$, with $i \in \{1, \ldots, N\}$) in order to obtain a spectrum ($I(\lambda)$), and to be applied to the spectra ($Qi(\lambda)$, with $i \in \{1, \ldots, N\}$) in order to obtain a spectrum ($Q(\lambda)$); and the spectrometer assembly comprises a calculation unit configured to calculate an amplitude spectrum ($R(\lambda)$) and a phase spectrum ($\theta(\lambda)$) of the optical radiation collected by the collection assembly using the following formulae:

$$R(\lambda) = \sqrt{\left(I(\lambda) - \frac{1}{2}I_0(\lambda)\right)^2 + \left(Q(\lambda) - \frac{1}{2}Q_0(\lambda)\right)^2} \text{ and}$$

$$\Theta(\lambda) = \arctan\left(\frac{Q(\lambda) - \frac{1}{2}Q_0(\lambda)}{I(\lambda) - \frac{1}{2}I_0(\lambda)}\right)$$

According to this embodiment, the spectrometer assembly comprises two, preferably identical, spectrometers. In a preferred manner, each spectrometer is calibrated prior to measurement by carrying out a quantum yield calibration and a dark current calibration.

The multiphase lock-in spectrometer assembly uses the time modulation of the optical radiation to be analyzed to measure its spectral power distribution, in other words, its "spectrum".

The multiphase lock-in spectrometer assembly implements purely optical lock-in detection, without recourse to an electronic lock-in amplifier, by synchronizing several, preferably identical, spectrometers in phase quadrature to the time modulation of the optical radiation source.

According to the invention, the expression "without recourse to the modulation assembly" refers to the fact that the measurement is carried out using a spectrometer on an intact source optical radiation beam, in other words, unaltered by the modulation assembly, when the modulation assembly is set to the "pass" position.

The spectrum measured is a complex spectrum, composed of an amplitude spectrum $R(\lambda)$, representing the optical radiation amplitude of each spectral component, from red to blue for visible light, and of a phase spectrum $\theta(\lambda)$ representing a relative phase, representative of a time delay, of each spectral component with respect to a reference component.

The amplitude spectrum $R(\lambda)$ is related to the intensity of the spectral components, like the "conventional" spectrum measured without lock-in detection. However, measurement in lock-in mode allows radiation that is not modulated at the frequency used to control the modulation assembly, such as, for example, natural radiation, background radiation or stray light, to be rejected.

The phase spectrum $\theta(\lambda)$ measures the time shift of the different wavelengths of the emitted optical radiation. For light, it includes information on the dynamics of light production, such as, for example, the excitation and de-excitation of LED luminophores.

The phase spectrum $\theta(\lambda)$ also includes information on the propagation differences observed along the optical path between the optical radiation source and the detection system, according to the different wavelengths.

The phase spectrum $\theta(\lambda)$ constitutes a signature of the optical radiation source, carrying information complementary to the amplitude spectrum $R(\lambda)$.

It is also possible to measure the amplitude spectrum $R(\lambda)$ and the phase spectrum $\theta(\lambda)$ at different modulation frequencies in order to obtain additional information.

The low-pass filter unit is either physical, the low-pass filtering is thus obtained by the accumulation of photoelectric charges in the photosensitive elements of the detector of each spectrometer during an acquisition time, or uses calculations by low-pass digital filtering of the N spectra i. An example of a low-pass digital filter would be to average the N spectra i.

It will be understood that in a preferred manner, the number N of time sections used to measure the $I(\lambda)$ and $Q(\lambda)$ spectra is identical, but that different numbers of time sections for $I(\lambda)$ and $Q(\lambda)$ can be used according to alternative embodiments.

The frequency fm typically has a value of 100 Hz, without the invention being limited in this respect.

The present invention has as another object a multiphase lock-in spectrometer assembly applied to a modulated multi-wavelength optical radiation source, said spectrometer assembly comprising a collection assembly configured to collect multi-wavelength optical radiation emitted by the modulated source, characterized in that the collection assembly comprises at least one collection optic and is configured to output at least one source optical radiation beam; the spectrometer assembly comprises a lock-in assembly configured to generate a reference signal based on the phase and modulation frequency of the optical radiation emitted by the optical radiation source, a single spectrometer, a modulation assembly configured to control, based on the reference signal, an acquisition by the spectrometer of a plurality of spectra, the spectra comprising information for at least one wavelength range of the wavelengths of the optical radiation, each spectrum being measured on N time sections of the source optical radiation beam, N being an integer greater than or equal to one, each time section having a duration corresponding to a period 1/fm and being spaced from a time section of the same type by a period 1/fm, with fm a frequency used to control the modulation assembly obtained from the reference signal; the spectrometer is configured to acquire the spectra $(Ii(\lambda), \text{with } i \in \{1, \ldots, N\})$ on first time sections, of a first source optical radiation beam, said to be in phase relative to the optical radiation collected by the collection assembly, then the spectra $(Qi(\lambda), \text{with } i \in \{1, \ldots, N\})$ on second time sections, of the first source optical radiation beam, in phase quadrature relative to the first time sections; the spectrometer is configured to carry out successively, at least once, the acquisition of the spectra $(Ii(\lambda), \text{with } i \in \{1, \ldots, N\})$ on the first time sections and the spectra $(Qi(\lambda), \text{with } i \in \{1, \ldots, N\})$ on the second time sections; the spectrometer is configured to measure, without recourse to the modulation assembly, a spectral quantity of the first source optical radiation beam $(I_0(\lambda)=Q_0(\lambda))$; the spectrometer assembly comprises a low-pass filter unit configured to be applied to the spectra $(Ii(\lambda), \text{with } i \in \{1, \ldots, N\})$ in order to obtain a spectrum $(I(\lambda))$, and to be applied to the spectra $(Qi(\lambda), \text{with } i \in \{1, \ldots, N\})$ in order to obtain a spectrum $(Q(\lambda))$; and the spectrometer assembly comprises a calculation unit configured to calculate an amplitude spectrum $(R(\lambda))$ and a phase spectrum $(\theta(\lambda))$ of the optical radiation collected by the collection assembly using the following formulae:

$$R(\lambda) = \sqrt{\left(I(\lambda) - \frac{1}{2}I_0(\lambda)\right)^2 + \left(Q(\lambda) - \frac{1}{2}Q_0(\lambda)\right)^2} \text{ and}$$

$$\Theta(\lambda) = \arctan\left(\frac{Q(\lambda) - \frac{1}{2}Q_0(\lambda)}{I(\lambda) - \frac{1}{2}I_0(\lambda)}\right)$$

This embodiment is an adaptation of the previous embodiment, allowing a single spectrometer to be used, while enjoying the same advantages as the previous embodiment. This embodiment is, however, more sensitive to the stability of the optical radiation collected, due to the fact that the acquisitions carried out for the spectra $I(\lambda)$ and the spectra $Q(\lambda)$ cannot be carried out simultaneously, but must be carried out in succession.

Preferably, the spectrometer is calibrated prior to measurement by carrying out a quantum yield calibration and a dark current calibration.

The present invention also has as another object a multiphase lock-in spectrometer assembly applied to a modulated multi-wavelength optical radiation source, said spectrometer assembly comprising a collection assembly configured to collect multi-wavelength optical radiation emitted by the modulated source, characterized in that the collection assembly comprises at least one collection optic and is configured to output at least four identical source optical radiation beams; the spectrometer assembly comprises a lock-in assembly configured to generate at least one reference signal based on the phase and modulation frequency of the optical radiation emitted by the optical radiation source, four spectrometers, a modulation assembly configured to control, based on the at least one reference signal, an acquisition by each spectrometer of a plurality of spectra, the spectra comprising information for at least one wavelength range of the optical radiation wavelengths, each spectrum being measured on N time sections of the source optical radiation beam, N being an integer greater than or equal to one, each time section having a duration corresponding to a period 1/fm and being spaced from a time section of the same type by a period 1/fm, with fm a frequency used to control the modulation assembly obtained from the at least one reference signal; a first spectrometer is configured to acquire the spectra (I1i($\lambda$), with i∈{1, ..., N}) on first time sections, of a first source optical radiation beam, said to be in phase relative to the optical radiation collected by the collection assembly; a second spectrometer is configured to acquire the spectra (Q1i($\lambda$), with i∈{1, ..., N}) on second time sections, of a second source optical radiation beam, in phase quadrature and in phase advance relative to the first time sections; a third spectrometer is configured to acquire the spectra (I2i($\lambda$), with i∈{1, ..., N}) on third time sections, of a third source optical radiation beam, in phase quadrature and in phase advance relative to the second temporal sections; a fourth spectrometer is configured to acquire the spectra (Q2i($\lambda$), with i∈{1, ..., N}) on fourth time sections, of a fourth source optical radiation beam, in phase quadrature and in phase advance relative to the third time sections; the spectrometer assembly comprises a low-pass filter unit configured to be applied to the spectra (I1i($\lambda$), with i∈{1, ..., N}) in order to obtain a spectrum (I1($\lambda$)), to be applied to the spectra (Q1i($\lambda$), with i∈{1, ..., N}) in order to obtain a spectrum (Q1($\lambda$)), to be applied to the spectra (I2i($\lambda$), with i∈{1, ..., N}) in order to obtain a spectrum (I2($\lambda$)), and to be applied to the spectra (Q2i($\lambda$), with i∈{1, ..., N}) in order to obtain a spectrum (Q2($\lambda$)); and the spectrometer assembly comprises a calculation unit configured to calculate an amplitude spectrum (R($\lambda$)) and a phase spectrum ($\theta$($\lambda$)) of the optical radiation collected by the collection assembly using the following formulae:

$$R(\lambda) = \sqrt{(I_1(\lambda) - I_2(\lambda))^2 + (Q_1(\lambda) - Q_2(\lambda))^2} \text{ and}$$

$$\Theta(\lambda) = \arctan\left(\frac{Q_1(\lambda) - Q_2(\lambda)}{I_1(\lambda) - I_2(\lambda)}\right)$$

This embodiment is an adaptation of the previous embodiments allowing the use of a so-called "imperfect" modulation assembly that does not modulate a source optical radiation beam one hundred percent, while enjoying the same advantages as the previous embodiments. An "imperfect" modulation assembly can, for example, use electro-optical modulators or acousto-optical modulators used for telecom fiber optics. These optical modulators present the advantage of being more compact and robust than mechanical modulators such as choppers.

In return, this embodiment requires the use of four, preferably identical, spectrometers. In a preferred manner, each spectrometer is calibrated prior to measurement, by performing a quantum yield calibration and a dark current calibration.

According to one embodiment, the collection assembly further comprises an optical radiation beam splitting assembly.

The use of an optical radiation beam splitting assembly allows an optical radiation beam collected using the collection assembly to be split into as many source optical radiation beams as required.

According to one embodiment, the collection assembly comprises at least as many collection optics configured to collect the optical radiation emitted by the optical radiation source as there are spectrometers.

This embodiment, for example, allows a dedicated collection optic to be used to obtain each source optical radiation beam.

According to one embodiment, at least one of the collection optics is chosen from a telescope, an integrating sphere, a photographic objective, a converging lens, an illuminance measurement cell and a luminance measurement cell.

The collection optics listed above represent "classic" collection optics particularly suited to collecting optical radiation under different conditions. It will be understood however, that as an alternative, the spectrometer assembly can use any type of collection optics suitable for collecting optical radiation.

According to one embodiment, the modulation assembly comprises at least one optical modulator, the at least one optical modulator preferably being chosen from among a mechanical modulator, an electro-optical modulator and an acousto-optical modulator.

The use of so-called "imperfect" optical modulators, which do not modulate an optical radiation beam one hundred percent, is preferably reserved for the four-spectrometer embodiment. The electro-optical modulators can, for example, be Pockels cells. The acousto-optical modulators can, for example, be Bragg cells. Preferably, the one- or two-spectrometer embodiments use optical modulators configured to modulate an optical radiation beam one hundred percent. An example of such an optical modulator is a mechanical modulator, or "chopper".

According to one embodiment, the modulation assembly is integrated into each spectrometer and is configured to control the acquisition of each spectrometer using a trigger signal.

In this embodiment, the lock-in assembly delivers a reference signal directly to the modulation assembly integrated into each spectrometer, which generates a trigger signal configured to control the acquisition of each spectrometer on each desired time section.

According to one embodiment, the modulation assembly is configured to use the modulation frequency of the optical radiation emitted by the optical radiation source as the control frequency fm.

According to one embodiment, the modulation assembly is configured to use a harmonic frequency of the modulation frequency of the optical radiation emitted by the optical radiation source as the control frequency fm, such that the amplitude spectrum (R($\lambda$)) and the phase spectrum ($\theta$($\lambda$))

characterize the non-linearity of a medium located between the optical radiation source and the collection assembly.

The harmonic frequency used may, for example, be double or triple the modulation frequency of the optical radiation emitted by the optical radiation source. The medium may, for example, be a solid, a liquid or a gas.

This embodiment can be used, for example, to characterize non-linear optical crystals, semiconductors or biological media. In the field of lighting, this embodiment can, for example, be used to study the non-linear behavior of LED luminophores in operation. This feature is very useful in non-destructive testing.

According to one embodiment, the lock-in assembly comprises a signal generator generating the at least one reference signal as a function of the power supply to the optical radiation source.

This embodiment allows to obtain the phase and modulation frequency of the optical radiation emitted by the optical radiation source by knowing the AC power supply source, which allows to discard the optical radiation in order to generate the reference signal(s). It is possible, for example, to use a signal at twice the frequency of the AC power supply to the modulated optical source, as the reference signal. For example, in France for a 50 Hz mains current, the time modulation of an optical radiation source, for example, a LED or discharge lamp, comprises a harmonic component at 50×2=100 Hz.

According to one embodiment, the spectrometer assembly further comprises an optical detection assembly configured to measure in real time the modulation frequency and the phase of the optical radiation emitted by the optical radiation source, and the lock-in assembly is connected to the optical detection assembly in such a way as to generate the at least one reference signal as a function of the measured phase and the measured modulation frequency.

This embodiment allows the phase and modulation frequency of the optical radiation emitted by the optical radiation source to be measured precisely and in real time so as to allow an amplitude spectrum $R(\lambda)$ and a phase spectrum $\theta(\lambda)$ representative of the optical radiation to be obtained.

According to one embodiment, the collection assembly comprises at least one collection optic dedicated to the optical detection assembly.

According to one embodiment, the optical radiation beam splitting assembly is configured to output at least one additional optical radiation beam configured to be output to the optical detection assembly.

This embodiment presents the advantage of not requiring the use of dedicated collection optics for the optical detection assembly.

According to one embodiment, at least one chain of communication between the optical detection assembly, the lock-in assembly and the modulation assembly is, at least in part, carried out using a telecommunication technique selected from among: VLC (visible light communication), Li-Fi®, Wi-Fi®, power line carrier (PLC), mobile telephony, preferably 5G, a radio frequency protocol, or a proprietary protocol.

The use of one of the techniques listed above allows a fast and efficient communication between the elements of the spectrometer assembly, although it will be understood that any type of communication allowing information to be transmitted between the elements of the spectrometer assembly may be used as an alternative.

The VLC (visible light communication) and Li-Fi techniques allow a particular embodiment in which at least part of the transmitted information can be coded in such a way as to be able to control the optical radiation source, so that said information is coded in the optical radiation emitted by the optical radiation source.

According to one embodiment, the spectrometer assembly further comprises a motorized platform able to direct the collection assembly in turn toward a plurality of optical radiation sources.

This embodiment allows measurements to be carried out successively using different optical radiation sources arranged in the environment. It will be understood that the platform is preferably servo-controlled so as to automate the aiming of the various optical radiation sources.

The present invention also relates to a use of a spectrometer assembly according to one of the above embodiments, characterized in that the use comprises the following steps: setting up a spectrometer assembly so that the collection assembly is able to successively target at least one lighting element arranged in the environment so that the spectrometer assembly successively uses each lighting element as a source of optical radiation, and using the spectrometer assembly to implement a differential optical absorption spectroscopy (DOAS) technique for measuring the concentration of at least one element present in the air, located between each lighting element and the collection assembly.

This use allows, in particular, to measure the pollutant concentration in the air. This use has recourse to lighting elements already located in the environment, such as public lighting fixtures, which has the advantage of allowing measurements without the need for an additional optical radiation source.

For this use, measurements are preferably carried out with a distance of a few hundred meters between the optical radiation source and the collection assembly. Furthermore, since detection is carried out in a lock-in manner, measurements can be carried out in daylight without interference related to the sunlight.

According to one embodiment, the at least one lighting element emits at least in a blue spectral range and the spectrometer assembly is configured to measure an NO2 concentration in the air and an air turbidity index.

According to one embodiment, the spectrometer assembly exploits a time modulation of the optical radiation emitted by the at least one lighting element at a dominant modulation frequency in order to be able to realize its use in the presence of daylight, the dominant modulation frequency preferably being between 90 Hz and 130 Hz.

For example, in the case of a mains-powered optical radiation source, the frequency of the time modulation is a function of the frequency of the AC voltage supplying the optical radiation source. In this case, in France the modulation frequency will be around 100 Hz, and in the USA or Japan around 120 Hz.

According to one embodiment, the modulated optical radiation source is a controlled source configured to emit at least one optical radiation at at least one modulation frequency.

In particular, the use of a controlled optical radiation source allows measurements to be made using the spectrometer assembly in order to obtain information about the optical radiation source as a function of the control parameters.

Furthermore, the use of a controlled optical radiation source can allow the emission of optical radiation at certain wavelengths in order to obtain, thanks to the measurements of the spectrometer assembly, information about a medium located between the optical radiation source and the collection assembly. The medium may, for example, be a solid, a liquid or a gas.

According to one embodiment, the controlled modulated optical radiation source is one from among a sample excited by a modulated pump laser, a sample excited by an AC electrical excitation source, a sample excited by a modulated thermal excitation source.

According to one embodiment, the spectrometer assembly is configured to obtain an amplitude spectrum (R(λ)) and a phase spectrum (θ(λ)) representative of at least one from among a blackbody radiation, a secondary light emission, a change in transmission properties, a change in reflection properties, a heat transfer, a charge scattering, an optical scattering, and a fluorescence.

The invention also has as its object, the use of a lock-in spectrometer assembly according to the present invention for one or more of the following applications:
  spectrophotometry of lighting and display sources, the spectrometer assembly being connected to an illuminance measuring cell (spectral illuminance measurement) or to a luminance measuring cell (spectral luminance measurement);
  optical measurement of air pollutant concentration;
  remote sensing using an artificial light source, allowing to eliminate stray light;
  spectrophotometry of modulated light sources, with the spectrometer assembly connected to an integrating sphere, an illuminance measuring cell or a luminance measuring cell to measure the amplitude and phase of the emission spectrum of modulated light sources;
  spectrophotometry of unmodulated light sources, in which the light emitted by the source is deliberately modulated to eliminate stray radiation;
  characterization of ocular exposure to modulated light;
  characterization of lighting related to image acquisition;
  physico-chemical analysis of scattering media;
  non-destructive testing of light sources;
  modulated photothermal analysis.

The present invention also has as its object a method of lock-in spectrometry applied to a modulated multi-wavelength optical radiation source, comprising the following steps:
  receive optical radiation from the source,
  from the received optical radiation, generate at least one source optical radiation beam, all the source optical radiation beams being identical,
  from the at least one source optical radiation beam, generate a plurality of first time sections of optical radiation beam called in-phase and a plurality of second time sections of optical radiation beam in phase quadrature relative to the first time sections,
  measure, by means of the at least one spectrometer a spectral quantity of each source optical radiation beam $I_0(\lambda)$, $Q_0(\lambda)$,
  acquire, by means of the at least one spectrometer, the spectra ($I_i(\lambda)$, with $i \in \{1, \ldots, N\}$) on the first time sections of the at least one source optical radiation beam, each spectrum being measured on N source optical radiation beam time sections,
  acquire, by means of the at least one spectrometer, the spectra ($Q_i(\lambda)$, with $i \in \{1, \ldots, N\}$) on the second time sections of the at least one source optical radiation beam, each spectrum being measured on N source optical radiation beam time sections,
  filter, by means of a low-pass filter unit, the spectra ($I_i(\lambda)$, with $i \in \{1, \ldots, N\}$) in order to obtain a spectrum $I(\lambda)$, and the spectra ($Q_i(\lambda)$, with $i \in \{1, \ldots, N\}$) in order to obtain a spectrum $Q(\lambda)$,
  calculate, by means of a calculation unit, an amplitude spectrum $R(\lambda)$ and a phase spectrum $\theta(\lambda)$ of the collected optical radiation using the following formulae:

$$R(\lambda) = \sqrt{\left(I(\lambda) - \frac{1}{2}I_0(\lambda)\right)^2 + \left(Q(\lambda) - \frac{1}{2}Q_0(\lambda)\right)^2} \text{ and}$$

$$\Theta(\lambda) = \arctan\left(\frac{Q(\lambda) - \frac{1}{2}Q_0(\lambda)}{I(\lambda) - \frac{1}{2}I_0(\lambda)}\right)$$

The at least one of source optical radiation beam can be obtained from the optical radiation coming from the optical source by an optical device (chopper . . . ) or electronically.

It is possible to use one or two source optical radiation beams and one or two spectrometers.

The present invention also has as its object a method of lock-in spectrometry applied to a modulated source of multi-wavelength optical radiation, comprising the following steps:
  receive optical radiation from the source,
  from the received optical radiation, generate a first source optical radiation beam, a second source optical radiation beam, a third source optical radiation beam and a fourth source optical radiation beam, which are identical,
  from the first, second, third and fourth source optical radiation beams, generate a plurality of first time sections of the optical radiation beam called in-phase, a plurality of second time sections of the optical radiation beam in phase quadrature and in phase advance relative to the first time sections, a plurality of third time sections of the optical radiation beam in phase quadrature and in phase advance relative to the second time sections, and a plurality of fourth time sections of the optical radiation beam in phase quadrature and in phase advance relative to the third temporal sections,
  acquire, by means of a first spectrometer, the spectra ($I_1i(\lambda)$, with $i \in \{1, \ldots, N\}$) on the first time sections, each spectrum being measured on N time sections of the source optical radiation beam,
  acquire, by means of a second spectrometer, the spectra ($Q_1i(\lambda)$, with $i \in \{1, \ldots, N\}$) on the second time sections, each spectrum being measured on N time sections of the source optical radiation beam,
  acquire, by means of a third spectrometer, the spectra ($I_2i(\lambda)$, with $i \in \{1, \ldots, N\}$) on the third time sections, each spectrum being measured on N time sections of the source optical radiation beam,
  acquire, by means of a fourth spectrometer, the spectra ($Q_2i(\lambda)$, with $i \in \{1, \ldots, N\}$) on the fourth time sections, each spectrum being measured on N time sections of the source optical radiation beam,
  filter, using a low-pass filter unit, the spectra ($I_1i(\lambda)$, with $i \in \{1, \ldots, N\}$) to obtain a spectrum ($I_1(\lambda)$), the spectra ($Q_1i(\lambda)$, with $i \in \{1, \ldots, N\}$) in order to obtain a spectrum ($Q1(\lambda)$), the spectra ($I_2i(\lambda)$, with $i \in \{1, \ldots, N\}$) in order to obtain a spectrum ($I_2(\lambda)$), and the spectra ($Q_{2i}(\lambda)$, with $i \in \{1, \ldots, N\}$) in order to obtain a spectrum ($Q_2(\lambda)$), calculate, using a calculation unit, an amplitude spectrum R(λ) and a phase spectrum θ(λ) of the collected optical radiation using the following formulae:

$$R(\lambda) = \sqrt{(I_1(\lambda) - I_2(\lambda))^2 + (Q_1(\lambda) - Q_2(\lambda))^2} \text{ and}$$

$$\Theta(\lambda) = \arctan\left(\frac{Q_1(\lambda) - Q_2(\lambda)}{I_1(\lambda) - I_2(\lambda)}\right)$$

BRIEF DESCRIPTION OF THE DRAWINGS

The embodiments of the present invention and uses according to the present invention will now be described by way of non-limiting example, with reference to the appended drawings.

In these drawings:

FIG. 1 is a schematic representation of a spectrometer assembly according to a first embodiment of the present invention.

FIG. 2 is a schematic representation of a spectrometer assembly according to a second embodiment of the present invention.

FIG. 3 is a schematic representation of a spectrometer assembly according to a third embodiment of the present invention.

DETAILED DESCRIPTION

Figure 4:
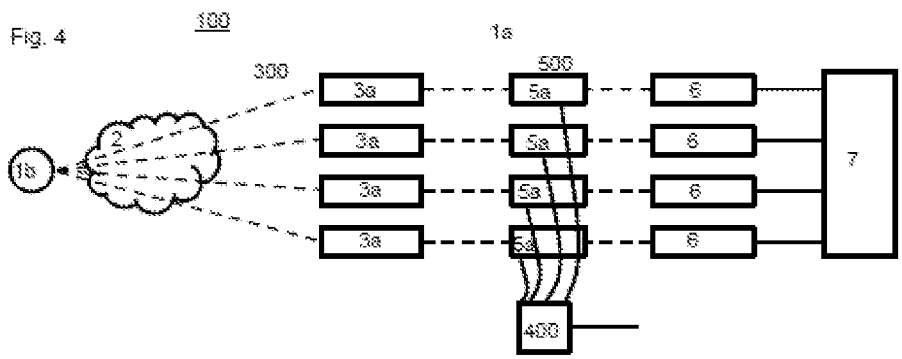
FIG. 4 is a schematic representation of a spectrometer assembly according to a fourth embodiment of the present invention.

In the figures, dashed lines represent optical radiation beams and solid lines represent communication links.

Referring to FIGS. 1 to 5, it can be seen that the spectrometer assembly 1 comprises a measurement assembly 1a applied to a modulated source 1b of multi-wavelength optical radiation between which a medium 2 is located. In FIGS. 1 to 5, the medium 2 is schematically represented in the form of a gas. However, it will be understood that the invention is not limited to a gas and that the medium 2 can be any medium through which optical radiation can propagate, such as a solid or a liquid.

Referring to FIG. 1, it can be seen that a spectrometer assembly 1 according to a first embodiment of the present invention is shown. According to this first embodiment, the spectrometer assembly 1 comprises two, preferably identical, spectrometers 6. The spectrometer assembly 1 further comprises a collection assembly 3, a lock-in assembly 4, a modulation assembly 5, a calculation unit 7 and an optical detection assembly 8.

As shown in FIG. 1, according to the first embodiment, the collection assembly 3 comprises a collection optic 3a, configured to collect an optical radiation beam from an optical radiation emitted by the optical radiation source 1b after the latter has propagated in the medium 2, and an optical radiation beam splitting assembly 3c, configured to split the collected optical radiation beam into two identical source optical radiation beams intended to be output to the modulation assembly 5 and into an additional optical radiation beam, identical to the source optical radiation beams, intended to be output to the optical detection assembly 8.

The optical detection assembly 8 is configured to measure in an accurate manner and in real time the phase and modulation frequency of the optical radiation, and to transfer this information to the lock-in assembly 4.

The lock-in assembly 4 is configured to generate a reference signal based on the phase and modulation frequency measured by the optical detection assembly 8.

In particular, the reference signal comprises a control frequency fm used to control the modulation assembly 5.

The lock-in assembly 4 is connected to the modulation assembly 5 to transfer the reference signal to the modulation assembly 5.

According to the first embodiment, the modulation assembly 5 is configured to modulate a first source optical radiation beam and a second source optical radiation beam as a function of the reference signal. The modulated beams are then output to the spectrometers 6.

As shown in FIG. 1, according to the first embodiment, the modulation assembly 5 comprises a single optical modulator 5a, the optical modulator 5a preferably being a mechanical chopper-type modulator.

The modulation assembly 5 is configured so as to control the acquisition by each spectrometer 6 of a plurality of spectra.

The spectra comprise information for all the wavelengths of optical radiation, and each spectrum is measured on N time sections of source optical radiation beam, with N an integer greater than or equal to one.

Each time section has a duration corresponding to a period 1/fm and is spaced from a time section of the same type by a period 1/fm, with fm the frequency used to control the modulation assembly 5 obtained from the reference signal.

A first spectrometer 6 is configured to acquire the spectra Ii(λ), with i∈{1, ..., N}, on first time sections, of the first source optical radiation beam, said to be in phase relative to the optical radiation collected by the collection assembly 3.

A second spectrometer 6 is configured to acquire the spectra Qi(λ), with i∈{1, ..., N}, on second time sections, of the second source optical radiation beam, in phase quadrature relative to the first time sections.

Furthermore, the first spectrometer 6 is configured to measure, independently of the modulation assembly 5, in other words, when the beam entering the first spectrometer 6 is the first intact optical radiation beam, a spectral quantity of the first source optical radiation beam I0(λ).

The second spectrometer 6 is configured to measure, independently of the modulation assembly 5, in other words, when the beam entering the second spectrometer 6 is the second intact optical radiation beam, a spectral quantity of the second source optical radiation beam Q0(λ).

As shown in FIG. 1, the spectrometers 6 are connected to the calculation unit 7 in order to process the spectra acquired by the spectrometers 6.

The spectrometer assembly 1 also comprises a low-pass filter unit. The low-pass filter unit is configured to be applied to the spectra Ii(λ), with i∈{1, ..., N}, in order to obtain a spectrum I(λ), and to be applied to the spectra Qi(λ), with i∈{1, ..., N}, in order to obtain a spectrum Q(λ).

It will be understood that preferably the number N of time sections used to measure the spectra I(λ) and Q(λ) is identical, but that different numbers of time sections for I(λ) and Q(λ) can be used according to alternatives.

According to the invention, the low-pass filter unit can be implemented either physically or by calculation.

When the low-pass filter unit is physical, low-pass filtering is carried out by the integration time of the spectrometer, in other words, the low-pass filtering is obtained by the accumulation of photoelectric charges in the photosensitive elements of the detector of each spectrometer during an acquisition time. The light-sensitive elements remain exposed for several time sections, then an acquisition is carried out.

When the low-pass filter unit involves calculations, the low-pass filter unit is integrated into the calculation unit 7, and the low-pass filtering is carried out by digital filtering of the spectra. An example of digital low-pass filtering would be to average the N spectra i.

Then, the calculation unit is configured to calculate an amplitude spectrum R(λ) and a phase spectrum θ(λ) of the optical radiation collected by the collection assembly 3 using the following formulae:

$$R(\lambda) = \sqrt{\left(I(\lambda) - \frac{1}{2}I_0(\lambda)\right)^2 + \left(Q(\lambda) - \frac{1}{2}Q_0(\lambda)\right)^2} \text{ and}$$

$$\Theta(\lambda) = \arctan\left(\frac{Q(\lambda) - \frac{1}{2}Q_0(\lambda)}{I(\lambda) - \frac{1}{2}I_0(\lambda)}\right)$$

Referring to FIG. 2, it can be seen that a spectrometer assembly 1 according to a second embodiment of the present invention is shown. The elements identical to the first embodiment bear the same reference number, while different elements bear the same reference number with a "'" character. According to this second embodiment, the spectrometer assembly 1' also comprises two, preferably identical, spectrometers 6. The second embodiment is identical to the first embodiment except for the points described below.

As shown in FIG. 2, according to the second embodiment, the collection assembly 3' of the spectrometer assembly 1' comprises a collection optic 3b dedicated to the optical detection assembly 8. This collection optic 3b dedicated to the optical detection assembly 8 is configured to collect an optical radiation beam from the optical radiation and to deliver this optical radiation beam to the optical detection assembly 8, in order to carry out the same measurements as for the first embodiment, in other words, measurements of the phase and modulation frequency of the optical radiation. The optical radiation beam splitting assembly 3c is configured to split the collected optical radiation beam into a first source optical radiation beam and a second identical source optical radiation beam intended to be output to the modulation assembly 5'. Unlike the first embodiment illustrated in FIG. 1, the optical radiation beam splitting assembly 3c does not provide an additional optical radiation beam intended to be output to the optical detection assembly 8.

According to the second embodiment, the modulation assembly 5' comprises two optical modulators 5a. A first optical modulator 5a configured to modulate the first source optical radiation beam and a second optical modulator 5a configured to modulate the second source optical radiation beam.

According to the second embodiment, the lock-in assembly 4' is configured to generate two reference signals which are output to the two optical modulators 5a in order to control the modulation based on the control frequency fm.

In the second embodiment, the spectra are acquired in the same way as in the first embodiment.

Referring to FIG. 3, a spectrometer assembly 10 according to a third embodiment of the present invention is shown. The elements identical to the first embodiment bear the same reference number, while different elements bear the same reference number multiplied by 10. According to this third embodiment, the spectrometer assembly 10 comprises a single spectrometer 6. As with the first two embodiments, according to the third embodiment, the spectrometer assembly 10 further comprises a collection assembly 3, a lock-in assembly 4, a modulation assembly 50, a calculation unit 7 and an optical detection assembly 8.

As shown in FIG. 3, according to the third embodiment, the collection assembly 3 comprises a collection optic 3a, configured to collect an optical radiation beam from an optical radiation emitted by the optical radiation source 1b after the latter has propagated in a medium 2, and an optical radiation beam splitting assembly 3c.

According to the third embodiment, the optical radiation beam splitting assembly 3c is configured to split the collected optical radiation into a source optical radiation beam intended to be output to the modulation assembly 50 and into an additional identical optical radiation beam intended to be output to the optical detection assembly 8.

As with the first two embodiments, according to the third embodiment, the optical detection assembly 8 is configured to accurately measure the phase and modulation frequency of the optical radiation in real time, and to transfer this information to the lock-in assembly 4.

According to the third embodiment, the lock-in assembly 4 is configured to generate a reference signal based on the phase and modulation frequency measured by the optical detection assembly 8.

In particular, the reference signal comprises a control frequency fm used to control the modulation assembly 50.

The lock-in assembly 4 is connected to the modulation assembly 50 to transfer the reference signal to the modulation assembly 50.

As shown in FIG. 3, according to the third embodiment, the modulation assembly 50 is integrated into the spectrometer 6. The reference signal is then used as a trigger signal, and the modulation assembly 50 is configured to control an acquisition by the spectrometer 6 of a plurality of spectra.

The spectra comprise information for all the wavelengths of optical radiation, and each spectrum is measured on N time sections of the source optical radiation beam, with N an integer greater than or equal to one.

Each time section has a duration corresponding to a period 1/fm and is spaced from a time section of the same type by a period 1/fm, with fm the frequency used to control the modulation assembly 50 obtained from the reference signal.

The spectrometer 6 is configured to acquire the spectra Ii(λ), with i∈{1, ..., N}, on first time sections, of the source optical radiation beam, said to be in phase relative to the optical radiation collected by the collection assembly 3, and then to acquire the spectra Qi(λ), with i∈{1, ..., N}, on second time sections, of the first source optical radiation beam, in phase quadrature relative to the first time sections.

According to the third embodiment, the spectrometer 6 is configured to successively carry out, at least once, the acquisitions of the spectra Ii(λ), with i∈{1, ..., N}, on the first time sections and of the spectra Qi(λ), with i∈{1, ..., N}, on the second time sections. It will be understood that the acquisitions are repeated several times as a function of the desired accuracy.

Furthermore, the spectrometer 6 is configured to measure, independently of the modulation assembly 50, in other words, on the intact source radiation beam, a spectral quantity of the source optical radiation beam I0(λ)=Q0(λ).

As shown in FIG. 3, the spectrometer 6 is connected to the calculation unit 7 in order to process the spectra acquired by the spectrometer 6.

As with the first two embodiments, according to the third embodiment, the spectrometer assembly 10 further comprises a low-pass filter unit. The low-pass filter unit is configured to be applied to the spectra Ii($\lambda$), with i$\in$ {1, ..., N}, in order to obtain a spectrum I($\lambda$), and to be applied to the spectra Qi($\lambda$), with i$\in$ {1, ..., N}, in order to obtain a spectrum Q($\lambda$).

It will be understood that, as with the first two embodiments, according to the third embodiment, preferably the number N of time sections used to measure the spectra I($\lambda$) and Q($\lambda$) is identical, but that different numbers of time sections for I($\lambda$) and Q($\lambda$) can be used according to alternatives.

According to the third embodiment, the low-pass filter unit is implemented by calculation. The low-pass filter unit is integrated into the calculation unit 7, and the low-pass filtering is carried out by digital filtering of the spectra. An example of digital low-pass filtering would be to average the N spectra i.

Then, the calculation unit is configured to calculate an amplitude spectrum R($\lambda$) and a phase spectrum $\theta$($\lambda$) of the optical radiation collected by the collection assembly 3 using the following formulae:

$$R(\lambda) = \sqrt{\left(I(\lambda) - \frac{1}{2}I_0(\lambda)\right)^2 + \left(Q(\lambda) - \frac{1}{2}Q_0(\lambda)\right)^2} \text{ and}$$

$$\Theta(\lambda) = \arctan\left(\frac{Q(\lambda) - \frac{1}{2}Q_0(\lambda)}{I(\lambda) - \frac{1}{2}I_0(\lambda)}\right)$$

The third embodiment is an adaptation of the first two embodiments, allowing a single spectrometer to be used, while enjoying the same advantages as the two-spectrometer embodiments. This third embodiment is, however, more sensitive to the stability of the optical radiation collected, due to the fact that the acquisitions carried out for the spectra I($\lambda$) and Q($\lambda$) cannot be carried out simultaneously but must be carried out in succession.

Referring to FIG. 4, it can be seen that a spectrometer assembly 100 according to a fourth embodiment of the present invention is shown. The elements identical to the first embodiment bear the same reference number, the differing elements bear the same reference number multiplied by 100. According to this fourth embodiment, the spectrometer assembly 100 comprises four spectrometers 6. According to the fourth embodiment, the spectrometer assembly 100 further comprises a collection assembly 300, a lock-in assembly 400, a modulation assembly 500, and a calculation unit 7.

As shown in FIG. 4, according to the fourth embodiment, the collection assembly 300 comprises four collection optics 3a, each configured to collect an optical radiation beam from an optical radiation emitted by the optical radiation source 1b after the latter has propagated in a medium 2. Unlike the first three embodiments, the fourth embodiment does not include an optical radiation beam splitting assembly 3c.

According to the fourth embodiment, each collection optic 3a is configured to output a source optical radiation beam to the modulation assembly 500, all the source optical radiation beams being identical as in the first three embodiments.

According to the fourth embodiment, the lock-in assembly 400 is configured to generate a reference signal and comprises a signal generator that generates four reference signals. The reference signals are preferably generated as a function of the power supply to the optical radiation source 1b. Alternatively, the reference signals could also be generated by other means, for example based on an external clock.

The lock-in assembly 400 according to the fourth embodiment allows to obtain the phase and modulation frequency of the optical radiation emitted by the optical radiation source 1b by knowing the waveform of the alternating current supplying the optical radiation source 1b, which allows to eliminate the measurements on the optical radiation to generate the reference signals.

The reference signals comprise in particular, a control frequency fm used to control the modulation assembly 500.

The lock-in assembly 400 is connected to the modulation assembly 500 to transfer the reference signals to the modulation assembly 500.

According to the fourth embodiment, the modulation assembly 500 is configured to modulate a first source optical radiation beam, a second source optical radiation beam, a third source optical radiation beam and a fourth source optical radiation beam, as a function of the reference signals. The modulated beams are then output to the spectrometers 6.

As shown in FIG. 4, according to the fourth embodiment, the modulation assembly 500 comprises four optical modulators 5a, the optical modulators 5a preferably being electro-optical modulators or acousto-optical modulators.

The modulation assembly 500 is configured in such a way as to control an acquisition by each spectrometer 6 of a plurality of spectra.

The spectra comprise information for all the wavelengths of optical radiation, and each spectrum is measured on N time sections of the source optical radiation beam, with N being an integer greater than or equal to one.

Each time section has a duration corresponding to a period 1/fm and is spaced from a time section of the same type by a period 1/fm, with fm the frequency used to control the modulation assembly 500 obtained from the reference signals.

A first spectrometer 6 is configured to acquire the spectra I1i($\lambda$), with i$\in$ {1, ..., N}, on first time sections, of the first source optical radiation beam, said to be in phase relative to the optical radiation collected by the collection assembly 3.

A second spectrometer 6 is configured to acquire the spectra Q1i($\lambda$), with i$\in$ {1, ..., N}, on second time sections, of the second source optical radiation beam, in phase quadrature and in phase advance relative to the first time sections.

A third spectrometer 6 is configured to acquire the spectra I2i($\lambda$), with i$\in$ {1, ..., N}, on third time sections, of the third source optical radiation beam, in phase quadrature and in phase advance relative to the second time sections.

A fourth spectrometer 6 is configured to acquire the spectra Q2i($\lambda$), with i$\in$ {1, ..., N}, on fourth time sections, of the fourth source optical radiation beam, in phase quadrature and in phase advance relative to the third time sections.

As shown in FIG. 4, the spectrometers 6 are connected to the calculation unit 7 in order to process the spectra acquired by the spectrometers 6.

As with the three first embodiments, according to the fourth embodiment, the spectrometer assembly 100 also comprises a low-pass filter unit. The low-pass filter unit is configured to be applied to the spectra I1i($\lambda$), with i$\in$ {1, ..., N}, in order to obtain a spectrum I1($\lambda$), to be applied to the spectra Q1i(λ), with i∈{1, . . . , N}, in order to obtain a Q1(λ) spectrum, to be applied to the spectra I2i(λ), with i∈{1, . . . , N}, in order to obtain an spectrum I2(λ), to be applied to the spectra Q2i(λ), with i∈{1, . . . , N}, in order to obtain a spectrum Q2(λ).

It will be understood that preferably the number N of the time sections used to measure the spectra I1(λ), Q1(λ), I2(λ) and Q2(λ) is identical, but that different numbers of time sections for I1(λ), Q1(λ), I2(λ) and Q2(λ) can be used according to alternative embodiments.

As with the first and second embodiments, according to the fourth embodiment, the low-pass filter unit can be implemented physically or by calculation.

When the low-pass filter unit is physical, low-pass filtering is carried out by the spectrometer integration time, in other words, the low-pass filtering is obtained by the accumulation of photoelectric charges in the photosensitive elements of the detector of each spectrometer during an acquisition time. The light-sensitive elements remain exposed during several time sections, after which an acquisition is carried out.

When the low-pass filter unit uses calculations, the low-pass filter unit is integrated into the calculation unit 7, and low-pass filtering is carried out by digital filtering of the spectra. An example of digital low-pass filtering would be to average on the N spectra i.

Then, the calculation unit is configured to calculate an amplitude spectrum R(λ) and a phase spectrum θ(λ) of the optical radiation collected by the collection assembly 3 using the following formulae:

$$R(\lambda) = \sqrt{(I_1(\lambda) - I_2(\lambda))^2 + (Q_1(\lambda) - Q_2(\lambda))^2} \text{ and}$$

$$\Theta(\lambda) = \arctan\left(\frac{Q_1(\lambda) - Q_2(\lambda)}{I_1(\lambda) - I_2(\lambda)}\right)$$

The fourth embodiment is an adaptation of the first, second and third embodiments, which allows the use of a so-called "imperfect" modulation assembly 500 that does not modulate a source optical radiation beam one hundred percent, while enjoying the same advantages as the previous embodiments. A so-called "imperfect" modulation assembly 500 may, for example, make use of electro-optical modulators or acousto-optical modulators used for telecom fiber optics. These optical modulators 5*a* present the advantage of being more compact and more robust than mechanical modulators, such as choppers.

On the other hand, the fourth embodiment requires the use of four, preferably identical, spectrometers 6.

Figure 5:
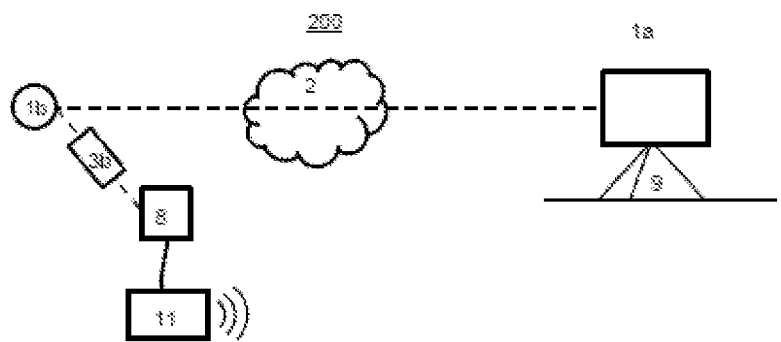
FIG. 5 is a schematic representation of a spectrometer assembly according to a fifth embodiment of the present invention.

Referring now to FIG. 5, it can be seen that a spectrometer assembly 200 according to a fifth embodiment is shown. The elements identical to the first embodiment bear the same reference number. The spectrometer assembly 200 according to the fifth embodiment is identical to any one of the previous embodiments with the exception of the points detailed below.

As shown in FIG. 5, according to the fifth embodiment, the spectrometer assembly 200 comprises a remote optical detection assembly 8 located in the immediate vicinity of the optical radiation source 1*b*. An optical radiation beam, collected from the optical radiation emitted by the optical radiation source 1*b* using a dedicated collection optic 3*b*, is output to the optical detection assembly 8 in such a manner as to be able to measure the phase and modulation frequency of the optical radiation. The optical detection assembly 8 is connected to a wireless communication assembly 11 configured to transmit the information measured by the optical detection assembly 8 to the lock-in assembly 4.

It will be understood that, as an alternative, the information can also be transmitted by wire.

As illustrated in FIG. 5, according to the fifth embodiment, the spectrometer assembly 200 also comprises a motorized platform 9 able to direct the collection assembly 3 in turn toward a plurality of optical radiation sources 1*b*, allowing measurements to be carried out successively using different optical radiation sources 1*b* arranged in the environment.

It will be understood that, preferably, the platform 9 is slaved so as to automate the aiming of the various optical radiation sources 1*b*.

The fifth embodiment is particularly adapted to the use of the spectrometer assembly 200 comprising the following steps: positioning the spectrometer assembly 200 in such a way that the collection assembly 3 is able to successively aim at several lighting elements, preferably public lighting fixtures, arranged in the environment in such a way that the spectrometer assembly 200 successively uses each lighting element as a source of optical radiation 1*b*, and to use the spectrometer assembly 200 to implement a differential optical absorption spectroscopy (DOAS) technique for measuring the concentration of several elements, preferably pollutants, present in a medium 2, preferably air, located between each lighting element and the collection assembly 3.

This use has recourse to lighting elements already arranged in the environment, such as public lighting fixtures, which has the advantage of allowing measurements without the need for an additional optical radiation source 1*b*.

For this use, the measurements are preferably carried out with a distance of a few hundred meters between the optical radiation source 1*b* and the collection assembly 3. Furthermore, since detection is carried out in a lock-in manner, the measurements can be carried out in daylight without interference related to the sunlight.

Preferably, each lighting element emits in a blue spectral range and the spectrometer assembly 200 is configured to measure an NO2 concentration in the air and an air turbidity index.

Even more preferably, the spectrometer assembly 200 exploits a time modulation of the optical radiation emitted by the lighting elements at a dominant modulation frequency in order to be able to carry out the use in the presence of daylight. The dominant modulation frequency is preferably between 90 Hz and 130 Hz.

For example, in the case of a mains-powered optical radiation source 1*b*, the time modulation is a function of the frequency of the AC voltage supplying the optical radiation source. In this case, in France the modulation frequency will be around 100 Hz, and in the USA or Japan around 120 Hz.

It will be understood that other uses are possible for a spectrometer assembly according to the invention 1, 1', 10, 100, 200, such as, for example, a use for which the modulated optical radiation source 1*b* is a controlled source configured to emit at least one optical radiation at, at least one modulation frequency.

In particular, the use of a controlled optical radiation source 1*b* allows the measurements to be made using the spectrometer assembly 1, 1', 10, 100, 200 in order to obtain information about the optical radiation source 1*b* as a function of the control parameters. Furthermore, the use of a controlled optical radiation source 1*b* can allow the emission of optical radiation at certain wavelengths in order to obtain, thanks to the measurements of the spectrometer assembly 1, 1', 10, 100, 200, information about a medium 2 located between the optical radiation source 1b and the collection assembly 3. The medium may, for example, be a solid, a liquid or a gas.

By way of non-limiting examples, the controlled modulated optical radiation source 1b may be a sample excited by a modulated pump laser, a sample excited by an AC electrical excitation source, or a sample excited by a modulated thermal excitation source.

By way of non-limiting examples, the spectrometer assembly 1, 1', 10, 100, 200 can be configured to obtain an amplitude spectrum $R(\lambda)$ and a phase spectrum $\theta(\lambda)$ representative of a blackbody radiation, a secondary light emission, a change in transmission properties, a change in reflection properties, a heat transfer, a charge scattering, an optical scattering, or a fluorescence.

Some possible uses for a spectrometer assembly 1, 1', 10, 100, 200 according to the present invention will be described below.

The uses of a spectrometer assembly according to the invention can be classified into two types, namely in situ uses and laboratory uses.

For in situ use, the collection assembly preferably comprises a telescope, a photographic lens or another similar optical sighting system.

For laboratory use, the collection assembly preferably comprises an integrating sphere, an illuminance measurement cell or a luminance measurement cell.

First of all, with regards to in situ use, this can, for example, include spectrophotometry of lighting or display sources. The most obvious use for a spectrometer assembly according to the invention is to allow to measure the spectrum of a modulated light source, such as a lamp or lighting fixtures for indoor or outdoor lighting, in the presence of daylight or stray/parasitic light. In this case, the collection assembly preferably comprises an illuminance measurement cell (spectral illuminance measurement) or a luminance measurement cell (spectral luminance measurement). This allows to measure lighting and display installations, for example, illuminated signs or advertising, both indoors and outdoors, in daylight. This makes it much easier and cheaper to check the performance and conformity of the installations and avoids the need to work at night.

It can also be used for the optical measurement of outdoor air pollutant concentrations, already mentioned above. One such application, for example, allows the measurement of NO2 concentration and turbidity index by a long-path DOAS technique, preferably using street lighting fixtures, preferably LEDs. The "blue" spectral range of light emitted by LEDs is exploited, as it corresponds to the molecular absorption signatures of nitrogen dioxide (NO2). The time modulation of light emitted by lighting fixtures is exploited at the dominant frequency of 100 Hz, or 120 Hz in the USA and Japan. A spectrometer assembly according to the invention allows the spectrum of a light beam transmitted through the atmosphere from a public lighting fixture in operation to be measured in broad daylight, at a large distance, preferably at a distance of between 100 m and 5 km. For this type of use, the collection assembly preferably comprises a telescope, more preferably a Newtonian-type or Cassegrain-type telescope, commercially available for astronomical observation. The optical radiation beams are preferably fiber-optically guided.

Even more preferably for this type of use, the spectrometer assembly comprises an optical detection assembly, preferably located on the lighting fixture, configured to measure in situ, the spectrum emitted by the LED lighting fixture and transmit the emission spectrum to the lock-in assembly, preferably, by means of an optical wireless link, for example, by VLC or LiFi® modulation superimposed on the light emitted by the lighting fixture, by means of a power line carrier (PLC) link, or by means of a radio frequency link, for example, by 5G, Lora®, Sigfox®, or similar.

Other uses for other remote sensing techniques using an artificial light source can also be mentioned. For example, in the case of LIDAR techniques, modulation of the laser source allows the use of a spectrometer assembly according to the invention to rapidly measure the spectrum of the reflected light and in the presence of stray/parasitic light. In the case of remote sensing techniques using multispectral or hyperspectral imaging, a spectrometer assembly according to the present invention can be used to improve the acquisition time of hyperspectral imagers and enhance immunity to ambient light.

If we now turn our interest to laboratory applications, one example to mention is spectrophotometry of modulated light sources. Preferably, the collection assembly comprises an integrating sphere, an illuminance measurement cell or a luminance measurement cell for laboratory measurement of the amplitude and phase emission spectrum ("complex" spectrum) of modulated light sources. This use constitutes an additional characterization, providing physical information on the dynamics of light production that was not accessible by conventional spectrometry, except by having recourse to very high-end spectrometers, based on the fast CMOS detectors, which are complex, less sensitive and more expensive than the standard compact spectrometers that can be used in a spectrometer assembly according to the present invention.

Alternatively, the optical spectrometry with electronic lock-in detection can also be mentioned. Another use of a spectrometer assembly according to the invention is to improve the sensitivity of the measurement of any source of unmodulated optical radiation by deliberately modulating the emitted light so as to be able to eliminate the parasitic or ambient radiation which does not present components at the chosen modulation frequency. This use is a novel alternative to scanning optical spectrometry with lock-in detection, used, for example, in chemical analysis, for example through analytical spectrometry. However, in this case, lock-in detection is conventionally carried out electronically and not optically. The advantages of a spectrometer assembly according to the invention are a reduction in signal processing complexity, a reduction in cost and a very significant reduction in spectrum acquisition time. The reduction factor is approximately equal to the number of spectral channels, which typically corresponds to a factor of 400 in the visible wavelength range.

It can also be used for a characterization of the ocular exposure to modulated light. Human exposure to modulated light emitted by lighting sources is the cause of undesirable visual effects, such as flicker, stroboscopic or phantom grating effects, and health effects, such as migraines and visual fatigue. A spectrometer assembly according to the invention allows human exposure to modulated light to be characterized more comprehensively than currently available measuring devices, such as flicker meters, which measure only the time waveform of light fluctuations, not their spectrum. The use for measuring the complex spectrum of modulated light received in the plane of the eye includes, for example studies of the visual perception of the chromatic effects of time light modulation, or "chromatic flicker", and studies of the Fechner-Benham mechanism of subjective color appearance.

It can also be used to characterize lighting related to image acquisition. The complex illumination spectrum can be used to explain undesirable "moiré" artifacts produced by image sensors in the presence of modulated light and periodic color patterns. Use is thus possible in machine vision and cinema, for example.

It can be used for a physico-chemical analysis of scattering media. A spectrometer assembly according to the invention can be used to measure the transmission spectrum, in amplitude and phase, of scattering media, for example, liquids or aerosols, for example, smoke, so as to study their optical properties. By using high modulation frequencies, for example of the order of a hundred MHz up to several GHz, the phase spectrum gives access to information on propagation times in these media according to the wavelength.

It can also be used for a non-destructive testing of light sources used in lighting. In this case, it is necessary to acquire complex spectra, amplitude and phase spectra, at several modulation frequencies to determine the parameters characteristic of the dynamics of light production and to be able to detect drifts in these parameters, such as the capacitances, junction resistances and inductances of a LED, and the time constants of phosphors.

Finally, we can mention a use for modulated photothermal analysis. Modulated photothermal analysis methods are used in the laboratory to study the optical, elastic and thermal properties of absorbing materials, for example, metals, semiconductors, composite materials or living tissue. Examples include photothermal radiometry and photothermal microscopy. These techniques use a modulated excitation laser, or "pump laser", to create an alternating thermal scattering in the material to be analyzed. This alternating thermal scattering is detected by optical signatures that can be passive, for example related to blackbody thermal emission, or active, for example, a deflection or scattering of a second probe laser beam. Modulated photothermal methods all use electronic lock-in detection to measure an optical signature that includes a component modulated at the modulation frequency of the excitation laser. A spectrometer assembly according to the invention allows the detection of spectral signatures of photothermal excitations to be improved by avoiding recourse to an electronic lock-in amplifier and simultaneously providing spectra of amplitude and phase lock-in with the laser excitation. A spectral signature is, for example, a modulated component of the thermal blackbody emission of the material under study, or a modulated component of the spectrum of a probe beam scattered by the medium under study.

According to the invention, as a function of the desired measurements, the frequency fm used to control the modulation assembly may correspond to the modulation frequency of the optical radiation emitted by the optical radiation source, or to a harmonic of the modulation frequency of the optical radiation, for example, the double frequency or triple frequency of the modulation frequency of the optical radiation. In the case where the modulation assembly is configured to use a harmonic frequency of the modulation frequency of the optical radiation, emitted by the optical radiation source, as the control frequency fm, the amplitude spectrum $R(\lambda)$ and phase spectrum $\theta(\lambda)$ obtained characterize the non-linearity of the medium located between the optical radiation source and the collection assembly. The medium may, for example, be a solid, a liquid or a gas. The use of a harmonic frequency can be useful for characterizing non-linear optical crystals, semiconductors or biological media. In the field of lighting, this embodiment allows, for example, the non-linear behavior of LED luminophores in operation, to be studied. This functionality is very useful in non-destructive testing.

According to the invention, the collection optics can be any element or device allowing an optical radiation beam from optical radiation emitted by an optical radiation source to be collected.

Collection optics may, for example, be one from among a telescope, an integrating sphere, a photographic lens, a convergent lens, an illuminance measurement cell, or a luminance measurement cell, as a function of the nature of the optical radiation source, of the distance between the collection assembly and the optical radiation source, and of the desired application.

According to the invention, the calculation unit presents itself in the form of a microcomputer, but may alternatively be any type of device allowing digital calculations to be carried out, for example, such as a processor, a microprocessor, a microcontroller, a digital signal processor (DSP), an application-specific component (ASIC), a programmable gate array (FPGA), associated with read-only memory or random access memory.

According to the invention, the optical detection assembly presents itself in the form of a photodiode, but may alternatively comprise any sensor able to measure the phase and modulation frequency of an optical radiation, for example, such as a phototransistor, a microbolometer, a CCD or CMOS image sensor, a pyroelectric sensor or a photovoltaic cell.

According to the invention, the optical radiation beam splitting assembly is an assembly configured to receive as input optical radiation beam and to output as many output optical radiation beams identical to the incoming optical radiation beam as required. According to the invention, the optical radiation beam splitting assembly is preferably a bundle of optical fibers with one input and two, three or four output fibers, a so-called "bifurcated" fiber bundle, a beam splitter, or a beam splitting prism.

According to the invention, in a preferred manner, when the modulation assembly comprises optical modulators, the modulation assembly comprises a slaved PLL configured to control the optical modulators.

According to the invention, in a preferred manner, when the spectrometer assembly comprises an optical detection assembly, the lock-in assembly comprises an analog-to-digital conversion electronic circuit configured to receive an analog electrical signal from the optical detection assembly and to generate the reference signal, preferably in the form of a TTL-type logic electrical signal. The analog-to-digital conversion electronics circuit may, for example, consist of a TTL converter comprising, for example, a decoupling stage for a DC component of the signal, a fixed electrical bias stage by means of a voltage divider bridge and a symmetrical threshold hysteresis comparator stage, or Schmidt flip-flop, around the fixed bias using an integrated operational amplifier, or comparator.

According to the invention, when the reference signal is obtained from the power supply of the optical radiation source, the electrical reference signal is preferably converted into a TTL logic signal, for example by a Schmidt flip-flop, and a "frequency doubler" electronic block is also associated to detect an optical signal that is modulated at a frequency double that of a power supply frequency. In France, for example, the power supply frequency is generally 50 Hz and the modulation frequency 50×2=100 Hz.

It will be understood that in a preferred manner, all the spectrometers in a spectrometer assembly are identical, however, as an alternative, the spectrometers can be different. In the case where the spectrometers are different, they preferably have a same spectral sensitivity, and a same wavelength resolution.

It will also be understood that, preferably, each spectrometer is calibrated prior to measurements, preferably by carrying out a quantum yield calibration and a dark current calibration.

It will be understood that according to the invention, optical radiation beams can be conducted by any means, such as, for example, in the air or in an optical fiber.

It will also be understood that the communication techniques allowing information transfer between the various elements of the spectrometer assembly are not limited by the present invention and that any type of communication allowing information to be transmitted between the elements of the spectrometer assembly can be used, such as, for example, communications by VLC (visible light communication), Li-Fi®, Wi-Fi®, power line carrier (PLC), mobile telephony, preferably 5G, a radio frequency protocol, or a proprietary protocol.

The VLC (visible light communication) and Li-Fi® techniques allow one particular embodiment in which at least one part of the transmitted information can be coded in such a way as to be able to control the optical radiation source, so that said information is coded in the optical radiation emitted by the optical radiation source.

Finally, it will be understood that the five embodiments described above are given as non-limiting examples and that other combinations of modulated optical radiation source, medium, collection assembly, lock-in assembly, modulation assembly, spectrometers, calculation unit and optical detection assembly, as described above are possible to implement the spectrometer assembly.

For example, an alternative of the fourth embodiment could use an optical detection assembly, comprising or not a dedicated optic, in replacement of or in addition to the signal generator of the lock-in assembly. Another alternative of the fourth embodiment could use a collection assembly with a single collection optic and an optical radiation beam splitting assembly configured to provide the four identical source optical radiation beams.

As a further example, an alternative of the third embodiment could measure four groups of quadrature spectra and could use the calculation time formulae presented for the fourth embodiment.

One alternative of the first, second or fourth embodiment could use a spectrometer-integrated modulation assembly of the type presented for the third embodiment.

One alternative of the second or fourth embodiment could use a modulation assembly comprising a single optical modulator.

One alternative of the first embodiment could use a modulation assembly comprising two optical modulators.

The person skilled in the art will appreciate that other configurations or uses are also possible without departing from the scope of the present invention.

The invention claimed is:

1. A multiphase lock-in spectrometer assembly configured to be applied to a modulated source of multi-wavelength optical radiation, said spectrometer assembly comprising a collection assembly configured to collect multi-wavelength optical radiation emitted by the modulated source, wherein:

the collection assembly comprises at least one collection optic and is configured to output at least two identical source optical radiation beams;

the spectrometer assembly comprises:

a lock-in assembly configured to generate at least one reference signal based on the phase and modulation frequency of the optical radiation emitted by the modulated source, two spectrometers, a modulation assembly configured to control, based on the at least one reference signal, an acquisition by each spectrometer of a plurality of spectra, the spectra comprising information for at least one wavelength range of the optical radiation wavelengths, each spectrum being measured on N time sections of source optical radiation beam, N being an integer greater than or equal to one, each time section having a duration corresponding to a period $1/f_m$ and being spaced from a time section of the same type by a period $1/f_m$, $f_m$ being a frequency used to control the modulation assembly obtained from the at least one reference signal;

a first spectrometer is configured to acquire the spectra ($I_i(\lambda)$, with $i \in \{1, \ldots, N\}$) on first time sections, of a first of source optical radiation beam, said to be in phase relative to the optical radiation collected by the collection assembly;

a second spectrometer is configured to acquire the spectra ($Q_i(\lambda)$, with $i \in \{1, \ldots, N\}$) on second time sections, of a second source optical radiation beam, in phase quadrature relative to the first time sections;

the first spectrometer is configured to measure, without recourse to the modulation assembly, a spectral quantity of the first source optical radiation beam ($I_0(\lambda)$);

the second spectrometer is configured to measure, without recourse to the modulation assembly, a spectral quantity of the second source optical radiation beam ($Q_0(\lambda)$);

the spectrometer assembly comprises a low-pass filter unit configured to be applied to the spectra ($I_i(\lambda)$, with $i \in \{1, \ldots, N\}$) in order to obtain a spectrum ($I(\lambda)$), and to be applied to the spectra ($Q_i(\lambda)$, with $i \in \{1, \ldots, N\}$) in order to obtain a spectrum ($Q(\lambda)$); and the spectrometer assembly comprises a calculation unit configured to calculate an amplitude spectrum ($R(\lambda)$) and a phase spectrum ($\theta(\lambda)$) of the optical radiation collected by the collection assembly using the following formulae:

$$R(\lambda) = \sqrt{\left(I(\lambda) - \frac{1}{2}I_0(\lambda)\right)^2 + \left(Q(\lambda) - \frac{1}{2}Q_0(\lambda)\right)^2} \text{ and}$$

$$\Theta(\lambda) = \arctan\left(\frac{Q(\lambda) - \frac{1}{2}Q_0(\lambda)}{I(\lambda) - \frac{1}{2}I_0(\lambda)}\right).$$

2. A multiphase lock-in spectrometer assembly configured to be applied to a modulated source of multi-wavelength optical radiation, said spectrometer assembly comprising a collection assembly configured to collect a multi-wavelength optical radiation emitted by the modulated source, wherein:

the collection assembly comprises at least one collection optic and is configured to output at least one source optical radiation beam;

the spectrometer assembly comprises:
- a lock-in assembly configured to generate a reference signal based on the phase and modulation frequency of the optical radiation emitted by the modulated source,
- a single spectrometer,
- a modulation assembly configured to control, based on the reference signal, an acquisition by the spectrometer of a plurality of spectra,
- the spectra comprising information for at least one wavelength range of the optical radiation wavelengths,
- each spectrum being measured on N time sections of the source optical radiation beam, N being an integer greater than or equal to one, each time section having a duration corresponding to a period 1/fm and being spaced from a time section of the same type by a period 1/fm, with $f_m$ a frequency used to control the modulation assembly obtained from the reference signal;
- the spectrometer is configured to acquire the spectra ($I_i(\lambda)$, with $i \in \{1, \ldots, N\}$) on first time sections, of a first source optical radiation beam, said to be in phase relative to the optical radiation collected by the collection assembly, then the spectra ($Q_i(\lambda)$, with $i \in \{1, \ldots, N\}$) on second time sections, of the first source optical radiation beam, in phase quadrature relative to the first time sections;
- the spectrometer is configured to successively carry out, at least once, the acquisition of the spectra ($I_i(\lambda)$, with $i \in \{1, \ldots, N\}$) on the first time sections and the spectra ($Q_i(\lambda)$, with $i \in \{1, \ldots, N\}$) on the second time sections;
- the spectrometer is configured to measure, without recourse to the modulation assembly, a spectral quantity of the first source optical radiation beam ($I_0(\lambda) = Q_0(\lambda)$);
- the spectrometer assembly comprises a low-pass filter unit configured to be applied to the spectra ($I_i(\lambda)$, with $i \in \{1, \ldots, N\}$) in order to obtain a spectrum ($I(\lambda)$), and to be applied to the spectra ($Q_i(\lambda)$, with $i \in \{1, \ldots, N\}$) in order to obtain a spectrum ($Q(\lambda)$); and
- the spectrometer assembly comprises a calculation unit configured to calculate an amplitude spectrum ($R(\lambda)$) and a phase spectrum ($\theta(\lambda)$) of the optical radiation collected by the collection assembly using the following formulae:

$$R(\lambda) = \sqrt{\left(I(\lambda) - \frac{1}{2}I_0(\lambda)\right)^2 + \left(Q(\lambda) - \frac{1}{2}Q_0(\lambda)\right)^2} \text{ and}$$

$$\Theta(\lambda) = \arctan\left(\frac{Q(\lambda) - \frac{1}{2}Q_0(\lambda)}{I(\lambda) - \frac{1}{2}I_0(\lambda)}\right).$$

3. The multiphase lock-in spectrometer assembly configured to be applied to a modulated source of multi-wavelength optical radiation, said spectrometer assembly comprising a collection assembly configured to collect multi-wavelength optical radiation emitted by the modulated source,
wherein:
- the collection assembly comprises at least one collection optic and is configured to output at least four identical source optical radiation beams;
- the spectrometer assembly comprises:
  - a lock-in assembly configured to generate at least one reference signal based on the phase and modulation frequency of the optical radiation emitted by the modulated source,
  - four spectrometers,
  - a modulation assembly configured to control, based on the at least one reference signal, an acquisition by each spectrometer of a plurality of spectra,
- the spectra comprising information for at least one wavelength range of the optical radiation wavelengths,
- each spectrum being measured on N time sections of the source optical radiation beam, N being an integer greater than or equal to one, each time section having a duration corresponding to a period 1/fm and being spaced from a time section of the same type by a period 1/fm, with $f_m$ a frequency used to control the modulation assembly-obtained from the at least one reference signal;
- a first spectrometer is configured to acquire the spectra ($I_{1i}(\lambda)$, with $i \in \{1, \ldots, N\}$) on first time sections, of a first source optical radiation beam, said to be in phase relative to the optical radiation collected by the collection assembly;
- a second spectrometer is configured to acquire the spectra ($Q_{1i}(\lambda)$, with $i \in \{1, \ldots, N\}$) on second time sections, of a second source optical radiation beam, in phase quadrature and in phase advance relative to the first time sections;
- a third spectrometer is configured to acquire the spectra ($I_{2i}(\lambda)$, with $i \in \{1, \ldots, N\}$) on third time sections, of a third source optical radiation beam, in phase quadrature and in phase advance relative to the second time sections;
- a fourth spectrometer is configured to acquire the spectra ($Q_{2i}(\lambda)$, with $i \in \{1, \ldots, N\}$) on fourth time sections, of a fourth source optical radiation beam, in phase quadrature and in phase advance relative to the third time sections;
- the spectrometer assembly comprises a low-pass filter unit configured to be applied to the spectra ($I_{1i}(\lambda)$, with $i \in \{1, \ldots, N\}$) in order to obtain a spectrum ($I_1(\lambda)$), to be applied to the spectra ($Q_{1i}(\lambda)$, with $i \in \{1, \ldots, N\}$) in order to obtain a spectrum ($Q_1(\lambda)$), to be applied to the spectra ($I_{2i}(\lambda)$, with $i \in \{1, \ldots, N\}$) in order to obtain a spectrum ($I_2(\lambda)$), and to be applied to the spectra ($Q_{2i}(\lambda)$, with $i \in \{1, \ldots, N\}$) in order to obtain a spectrum ($Q_2(\lambda)$); and
- the spectrometer assembly comprises a calculation unit configured to calculate an amplitude spectrum ($R(\lambda)$) and a phase spectrum ($\theta(\lambda)$) of the optical radiation collected by the collection assembly using the following formulae:

$$R(\lambda) = \sqrt{(I_1(\lambda) - I_2(\lambda))^2 + (Q_1(\lambda) - Q_2(\lambda))^2} \text{ and}$$

$$\Theta(\lambda) = \arctan\left(\frac{Q_1(\lambda) - Q_2(\lambda)}{I_1(\lambda) - I_2(\lambda)}\right).$$

4. The spectrometer assembly according to claim 1, wherein the collection assembly further comprises an optical radiation beam splitting assembly.

5. The spectrometer assembly according to claim 1, wherein the collection assembly comprises at least as many collection optics configured to collect the optical radiation emitted by the optical radiation source as there are spectrometers.

6. The spectrometer assembly according to claim 1, wherein at least one of the collection optics is chosen from among a telescope, an integrating sphere, a photographic objective, a converging lens, an illuminance measurement cell and a luminance measurement cell.

7. The spectrometer assembly according to claim 1, wherein the modulation assembly comprises at least one optical modulator.

8. The spectrometer assembly according to claim 1, wherein the modulation assembly is integrated into each spectrometer and is configured to control the acquisition of each spectrometer by means of a trigger signal.

9. The spectrometer assembly according to claim 1, wherein the modulation assembly-is configured to use the modulation frequency of the optical radiation emitted by the optical radiation source as control frequency $f_m$.

10. The spectrometer assembly according to claim 1, wherein the modulation assembly is configured to use a harmonic frequency of the modulation frequency of the optical radiation emitted by the optical radiation source as the control frequency $f_m$, such that the amplitude spectrum ($R(\lambda)$) and the phase spectrum ($\theta(\lambda)$) characterize the non-linearity of a medium located between the optical radiation source and the collection assembly.

11. The spectrometer assembly according to claim 1, wherein the lock-in assembly comprises a signal generator generating the at least one reference signal as a function of the power supply to the optical radiation source.

12. The spectrometer assembly according to claim 4, wherein the spectrometer assembly further comprises an optical detection assembly configured to measure, in real time, the modulation frequency and phase of the optical radiation emitted by the optical radiation source, and the lock-in assembly is connected to the optical detection assembly so as to generate the at least one reference signal as a function of the measured phase and the measured modulation frequency.

13. The spectrometer assembly according to claim 12, wherein the collection assembly comprises at least one collection optic dedicated to the optical detection assembly.

14. The spectrometer assembly according to claim 12, wherein the optical radiation beam splitting assembly is configured to output at least one additional optical radiation beam configured to be output to the optical detection assembly.

15. The spectrometer assembly according to claim 12, wherein at least one communication chain between the optical detection assembly, the lock-in assembly and the modulation assembly is, at least in part, carried out using a telecommunication technique selected from among: VLC (visible light communication), Li-Fi, Wi-Fi, power line carrier, mobile telephony, a radio frequency protocol, or a proprietary protocol.

16. The spectrometer assembly according to claim 1, further comprising a motorized platform able to direct the collection assembly in turn toward a plurality of optical radiation sources.

17. A method for measuring the concentration of at least one element, comprising:
providing the spectrometer assembly according to claim 1,
positioning the spectrometer assembly so that the collection assembly is able to successively aim at, at least one illuminating element arranged in the environment so that the spectrometer assembly successively uses each illuminating element as a source of optical radiation, each illuminating element being a modulated source of multi-wavelength optical radiation, and
using the spectrometer assembly to implement a differential optical absorption spectroscopy technique to measure the concentration of at least one element present in the air located between each lighting element and the collection assembly.

18. The use-method according to claim 17, wherein the at least one lighting element emits at least in a blue spectral range and the spectrometer assembly is configured to measure a concentration of $NO_2$ in the air and a turbidity index of the air.

19. The method according to claim 17, wherein the spectrometer assembly exploits a time modulation of the optical radiation emitted by the at least one lighting element at a dominant modulation frequency in order to be able to carry out the method in the presence of daylight.

20. A lock-in spectrometry method applied to a modulated source of multi-wavelength optical radiation, the method comprising:
receiving optical radiation from the source,
from the received optical radiation, generating at least one source optical radiation beam, all the source optical radiation beams being identical,
from the at least one source optical radiation beam, generating a plurality of first time sections of the optical radiation beam called in-phase and a plurality of second time sections of the optical radiation beam in phase quadrature relative to the first time sections,
measuring by means of at least one spectrometer a spectral quantity of each source optical radiation beam $I_0(\lambda)$, $Q_0(\lambda)$,
acquiring, by means of the at least one spectrometer, the spectra ($I_i(\lambda)$, with $i \in \{1, \ldots, N\}$) on the first time sections of the at least one source optical radiation beam, each spectrum being measured on N time sections of the source optical radiation beam,
acquiring, by means of the at least one spectrometer, the spectra ($Q_i(\lambda)$, with $i \in \{1, \ldots, N\}$) on the second time sections of the at least one source optical radiation beam, each spectrum being measured on N time sections of the source optical radiation beam
filtering, by a low-pass filter unit, the spectra ($I_i$, with $i \in \{1, \ldots, N\}$) in order to obtain a spectrum, $I(\lambda)$, and the spectra ($Q_i(\lambda)$, with $i \in \{1, \ldots, N\}$) in order to obtain a spectrum Q,
calculating, using a calculation unit, an amplitude spectrum $R(\lambda)$ and a phase spectrum $\theta(\lambda)$ of the collected optical radiation using the following formulae:

$$R(\lambda) = \sqrt{\left(I(\lambda) - \frac{1}{2}I_0(\lambda)\right)^2 + \left(Q(\lambda) - \frac{1}{2}Q_0(\lambda)\right)^2} \text{ and}$$

$$\Theta(\lambda) = \arctan\left(\frac{Q(\lambda) - \frac{1}{2}Q_0(\lambda)}{I(\lambda) - \frac{1}{2}I_0(\lambda)}\right).$$

21. A method of lock-in spectrometry applied to a modulated source of multi-wavelength optical radiation, for a multiphase lock-in spectrometer according to claim 3, the method comprising:
receiving, by the collection assembly, optical radiation from the source,
from the received optical radiation, a first source optical radiation beam, a second source optical radiation beam, a third source optical radiation beam and a fourth source optical radiation beam, which are identical,
from the first, second, third and fourth source optical radiation beams, generating a plurality of first time sections of the optical radiation beam called in-phase, a plurality of second time sections of the optical radiation beam in phase quadrature and in phase advance relative to the first time sections, a plurality of third time sections of the optical radiation beam in phase quadrature and in phase advance relative to the second time sections, and a plurality of fourth time sections of the optical radiation beam in phase quadrature and in phase advance relative to the third time sections, acquiring, by means of the first spectrometer, the spectra $(I_{1i}(\lambda)$, with $i \in \{1, \ldots, N\})$ on the first time sections, each spectrum being measured on N time sections of the source optical radiation beam, acquiring, by means of the second spectrometer, the spectra $(Q_{1i}(\lambda)$, with $i \in \{1, \ldots, N\})$ on the second time sections, each spectrum being measured on N time sections of the source optical radiation beam, acquiring, by means of the third spectrometer, the spectra $(I_{2i}(\lambda)$, with $i \in \{1, \ldots, N\})$ on the third time sections, each spectrum being measured on N time sections of the source optical radiation beam, acquiring, by means of the fourth spectrometer, the spectra $(Q_{2i}(\lambda)$, with $i \in \{1, \ldots, N\})$ on the fourth time sections, each spectrum being measured on N time sections of the source optical radiation beam, filtering, by using the low-pass filter unit, the spectra $(I_{1i}(\lambda)$, with $i \in \{1, \ldots, N\})$ in order to obtain a spectrum $(I_1(\lambda))$, the spectra $(Q_{1i}(\lambda)$, with $i \in \{1, \ldots, N\})$ in order to obtain a spectrum $(Q_1(\lambda))$, the spectra $(I_{2i}(\lambda)$, with $i \in \{1, \ldots, N\})$ in order to obtain a spectrum $(I_2(\lambda))$, and the spectra $(Q_{2i}(\lambda)$, with $i \in \{1, \ldots, N\})$ in order to obtain a spectrum $(Q_2(\lambda))$, calculating, by using the calculation unit, an amplitude spectrum $R(\lambda)$ and a phase spectrum $\theta(\lambda)$ of the collected optical radiation using the following formulae:

$$R(\lambda) = \sqrt{(I_1(\lambda) - I_2(\lambda))^2 + (Q_1(\lambda) - Q_2(\lambda))^2} \text{ and}$$

$$\Theta(\lambda) = \arctan\left(\frac{Q_1(\lambda) - Q_2(\lambda)}{I_1(\lambda) - I_2(\lambda)}\right).$$

\* \* \* \* \*